United States Patent [19]

Volk, Jr.

[11] 4,140,950
[45] Feb. 20, 1979

[54] CONTROL SYSTEM FOR TWO-PHASE REVERSIBLE MOTOR

[75] Inventor: Joseph A. Volk, Jr., Florissant, Mo.

[73] Assignee: Borg-Warner Corporation, Chicago, Ill.

[21] Appl. No.: 864,419

[22] Filed: Dec. 27, 1977

[51] Int. Cl.² .............................................. H02P 1/42
[52] U.S. Cl. ..................................... 318/749; 318/805
[58] Field of Search ........... 318/207 R, 207 A, 207 B, 318/207 C, 227, 230

[56] References Cited

U.S. PATENT DOCUMENTS

| 3,183,425 | 5/1965 | Slawson | 318/227 |
| 3,800,201 | 3/1974 | Gaul et al. | 318/207 B |
| 3,896,355 | 7/1975 | Guicheteau | 318/207 B |
| 3,993,940 | 11/1976 | Volk, Jr. | 318/227 X |

Primary Examiner—Gene Z. Rubinson
Attorney, Agent, or Firm—James E. Tracy

[57] ABSTRACT

By closing a series-connected first solid state switch, such as a triac, AC line voltage is applied directly to the first of two field windings of a two-phase reversible AC induction motor to drive the motor in one of its two directions. The shifted phase voltage, appearing at the other or second field winding, has a magnitude of about twice that of the line voltage and is employed to supply gate current to the first solid state switch over a cross-coupling circuit. Conversely, when motor rotation in the opposite direction is desired a second solid state switch or triac is rendered to conductive to apply the AC line voltage directly to the second field winding, the gate current for the second solid state switch being derived from the high magnitude shifted voltage appearing at the first winding. Since the gating voltage is phase displaced (by approximately 90°) with respect to the AC voltage applied to the main terminals of the gated triac, the gating voltage will have a relatively high instantaneous amplitude each time the applied AC voltage crosses its a-c axis, namely, goes through zero amplitude. As a result, the triac will be immediately regated at the start of each half cycle. In effect, the triac will be DC gated.

7 Claims, 1 Drawing Figure

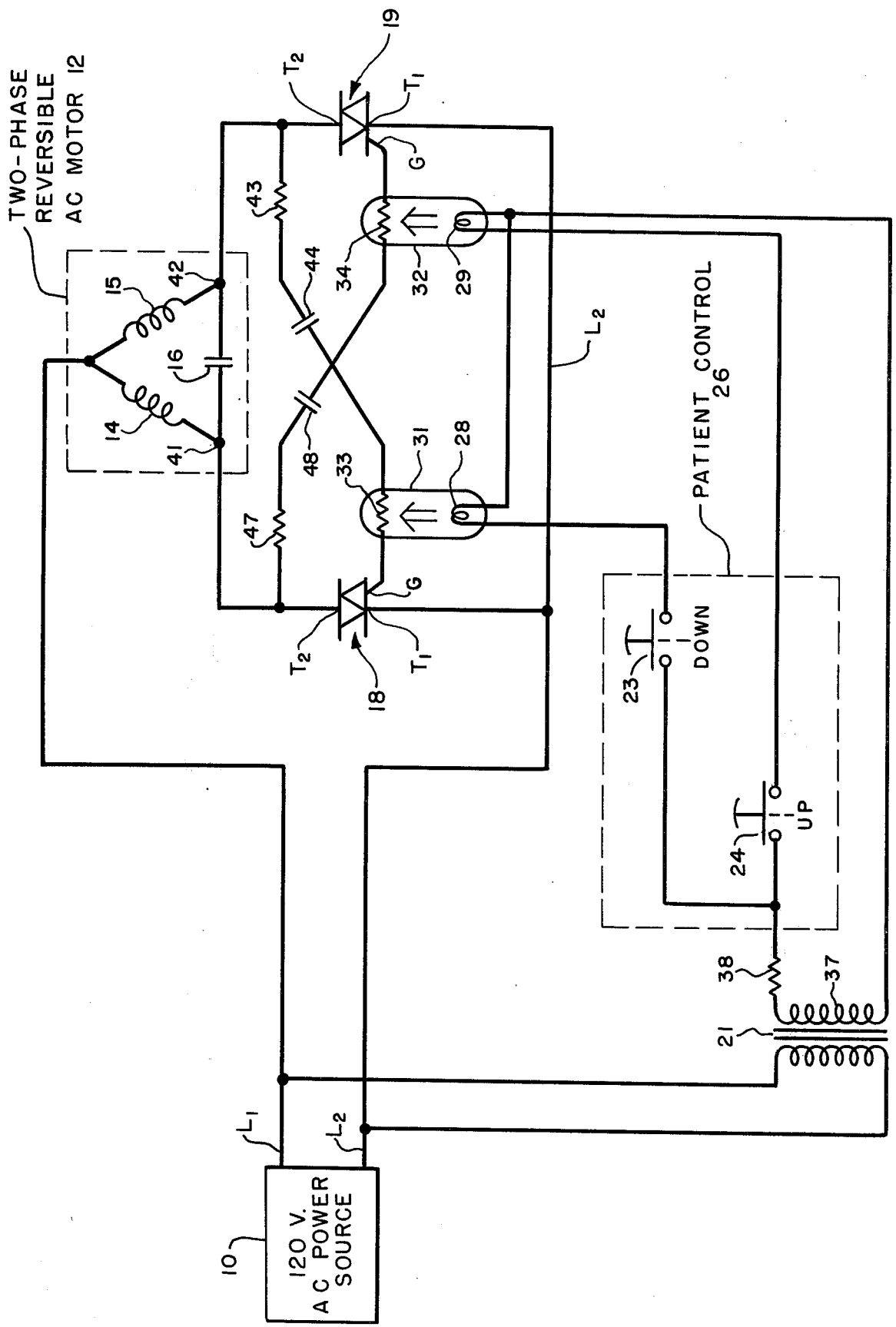

CONTROL SYSTEM FOR TWO-PHASE REVERSIBLE MOTOR

BACKGROUND OF THE INVENTION

This invention relates generally to a control circuit for an AC motor and particularly to a control system for maintaining a two-phase reversible AC induction motor rotating selectively in either direction. While the invention may be employed with any two-phase reversible motor, it is especially attractive when used in conjunction with the motor-drive system in an adjustable motorized hospital bed and will be described in that environment.

A motor operated hospital bed usually includes a hand-held, push button-actuated control device for permitting the patient occupying the bed to remotely control various adjustments of the bed merely by selectively depressing different spring-loaded push buttons, which in turn vary the operation of a control system for the bed. Ordinarily, the mattress-supporting structure of the bed is articulated, being divided into four interconnected sections or panels, namely a back section, a center or seat section, an upper knee or thigh section, and a lower knee or foot section. One motor-driven adjustment that may be controlled by the patient raises or lowers the two knee sections where they join together, thereby controlling the position of the patient's knees. Another adjustment, under the patient's control, pivots or tilts the back section with respect to the center section so that the patient's back and head may be raised or lowered. A third motor-driven adjustment may be controlled by the hand-held push button-actuated control device to vertically adjust the entire mattress-supporting frame. Each of these three adjustments is achieved by a respective one of three reversible AC motors.

To safeguard the patient from hazardous electrical shocks from the voltages present in the motor drive circuitry, some non-electrical coupling (such as optical coupling) is preferably employed in the control system to electrically isolate the patient's hand control unit. For example, in U.S. Pat. No. 3,993,940, issued Nov. 23, 1976 in the name of Joseph A. Volk, Jr., and assigned to the present assignee, a control system, having optical or photo couplers, is disclosed for operating a two-phase reversible AC induction motor to vary the high-low adjustment of a hospital bed. In that prior control arrangement, a pair of solid state switches (preferably in the form of triacs) are selectively turned on to apply AC line voltage directly to a selected one of the two field windings of the motor to effect motor rotation in a selected direction to either raise or lower the bed. By energizing photo couplers in the gating circuits, AC voltage is used to selectively gate each triac, the gating voltage being in phase with that appearing across the main terminals $T_1$, $T_2$ of the gated triac. Hence, each time the $T_1$-$T_2$ voltage completes a half cycle and goes through zero amplitude, the gating voltage is doing likewise. The gating voltage must then increase significantly before the triac is regated during the next half cycle. As a consequence, during an initial portion of each half cycle the triac does not conduct, and then when it does conduct electrical noise is produced, giving rise to radio frequency interference (or RFI) which may deleteriously affect the operation of medical electronic equipment in the immediate area.

In this prior control system, the shifted phase voltage, which has a magnitude about twice that of the line voltage, is applied to the inactive photo coupler which controls the non-conducting triac. This means that the photo couplers must have a relatively high voltage rating so that they do not break down under high voltage stress.

It is also necessary in prior control systems, like that shown in U.S. Pat. No. 3,993,940, to interlock the manually-operated switches so that it is impossible to render both triacs conductive at the same time, in which case there would be no motor rotation since in-phase voltages would be applied to both field windings.

The present invention overcomes these, as well as other, shortcomings of prior control systems for two-phase reversible motors. Moreover, the unique construction of the present control system renders it considerably less expensive than those developed heretofore.

SUMMARY OF THE INVENTION

The control system of the present invention controls the operation of a two-phase reversible AC induction motor selectively in either direction or rotation, the motor including, in delta connection, first and second field windings and a phase shift capacitor. The first field winding is coupled via a series-connected first solid state switch to an AC power source which provides AC line voltage of predetermined magnitude. The second field winding is coupled to the AC power source via a series-connected second solid state switch. A first cross-coupling circuit, including a series-connected first photo resistor of a first photo coupler, is coupled from the junction of the first field winding and first solid state switch to the gate terminal of the second solid state switch. Conversely, a second cross-coupling circuit, including a series-connected second photo resistor of a second photo coupler, is coupled from the junction of the second field winding and second solid state switch to the gate terminal of the first solid state switch. First energizing means energizes the second photo coupler to supply gate current to the gate terminal of the first solid state switch to render the first solid state switch conductive, thereby to apply the AC line voltage from the power source directly to the first field winding to effect rotation of the motor in one direction. The control system also includes second energizing means for energizing the first photo coupler to supply gate current to the gate terminal of the second solid state switch to render that switch conductive, thereby to apply the AC line voltage directly to the second field winding to rotate the motor in the opposite direction.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing which schematically illustrates a control system, constructed in accordance with the invention, and the manner in which the control system is connected to a two-phase reversible AC induction motor capable of varying the high-low adjustment of a hospital bed.

DESCRIPTION OF THE ILLUSTRATED EMBODIMENT

Block 10 represents a conventional AC power supply or source providing a single-phase alternating voltage having a magnitude of approximately 120 volts RMS and a commutating frequency of 60 cycles per second or hertz. Since this AC voltage is usually available at a wall outlet in any hospital room where an adjustable hospital bed is located, it may conveniently be referred to as AC line voltage. As a safety precaution, it is preferred that the AC line voltage available at the wall outlet be channeled through an isolation transformer with a 1:1 turns ratio before it is delivered to the output terminals of power source 10. In this way, the hospital bed's control circuitry is electrically isolated from the main AC power supply of the building. The instantaneous line voltage at the output terminal connected to conductor $L_1$ will alternate in generally sinusoidal fashion above (or positive) and below (or negative) relative to the instantaneous voltage found on conductor $L_2$.

Two-phase reversible AC induction motor 12 is of conventional construction having, in delta connection, a pair of field windings 14 and 15 and a phase shift capacitor 16. When 120 volts AC from source 10 is applied directly across field winding 14, that same voltage, except almost 90° phase shifted, will appear across winding 15 and the motor will rotate in a direction to effect lowering of the hospital bed's mattress-supporting structure. Conversely, when 120 volts AC is applied to winding 15 it is phase shifted close to 90° by capacitor 16 and applied across winding 14, with the result that the motor rotates in the opposite direction to cause elevation of the mattress-supporting frame.

A pair of solid state switches, in the form of triacs 18 and 19, are provided to apply the AC line voltage from source 10 directly to either field winding 14 or field winding 15. As is well known, in the absence of any applied voltages a triac assumes its off condition in which a very high impedance exists between its main terminals $T_1$ and $T_2$ to effectively constitute an open switch. When a voltage of either polarity is impressed across the main terminals, the triac remains non-conductive until gate or triggering current of appropriate magnitude is translated between the gate terminal G and the main terminal $T_1$ in either direction, whereupon the triac turns on and permits current flow between terminals $T_1$ and $T_2$ in response to the voltage applied thereto and in the direction determined by the voltage's polarity. Once the triac is rendered conductive, a very low impedance is presented between its main terminals so that it essentially functions as a closed switch, as a consequence of which the full line voltage from AC power supply 10 will be applied directly to either winding 14 or 15 depending on which triac is turned on. As is common with triacs, conduction between terminals $T_1$ and $T_2$ will continue even though the gate current may be terminated so long as there is a potential difference across the main terminals. When the $T_1$-$T_2$ voltage is reduced to zero, the triac therefore returns to its off state. Thereafter, when the voltage across the main terminals is increased from zero, conduction will not occur until the triac is regated, namely until gate current again flows between gate G and terminal $T_1$.

Since a triac automatically switches to its off condition each time the alternating voltage appearing across its main terminals crosses its a-c axis, at which time a zero potential difference exists between terminals $T_1$-$T_2$, gate current must be supplied to the gate terminal at some instant following the beginning of each half cycle or alternation if power supply 10 is to be connected to the motor for at least a portion of each half cycle. In other words, at the end of each half cycle of one polarity, the triac which is to be effective assumes its non-conductive state. The polarity of the alternating voltage appearing across its main terminals then changes at the start of the next half cycle, thereby requiring retriggering at the gate before the triac turns on and $T_1$-$T_2$ current flow takes place. As will be made apparent, in accordance with a feature of the present invention maximum gate current is supplied to the effective one of triacs 18 and 19 as its $T_1$14 $T_2$ voltage goes through zero amplitude so that immediate regating occurs at the very beginning of the next half cycle.

Consideration will now be given to the circuitry which controls the operation of triacs 18 and 19. Transformer 21 preferably has a turns ratio of 6:1 and is provided to reduce the 120 volts AC of power source 10 to around 20 volts for use in the switching circuits controlled by the patient. Of course, this provides an additional safeguard against the possibility of the patient being subject to hazardous electrically shocks. Switches 23 and 24 are spring-loaded, push button-actuated momentary contact switches and are included in patient control device 26, preferably a hand-held instrument to facilitate ease of operation for the patient. With those push button switches in their normally-open positions as illustrated in the drawing, no AC voltage is applied to the light emitting devices or lamps 28 and 29 of photo couplers 31 and 32, respectively, and each of photo resistors 33 and 34 will exhibit a high resistance. Under those conditions, insufficient gate current will flow to the gate terminals of triacs 18 and 19 to turn them on. With both triacs turned off, circuit junctions 41 and 42 in motor 12 will be at the same potential, namely 120 volts AC with respect to line conductor $L_2$.

Assume now that the patient wishes to lower the bed's mattress support. To do so he actuates down switch 23 in order to apply the 20 volts AC, produced across secondary winding 37 of transformer 21, to lamp 28 to effect energization thereof. Resistor 38 functions as a current-limiting resistor. The illumination of lamp 28 causes the resistance of photo resistor 33 to drop to the extent necessary to supply gate current from junction 42, and via the cross-coupling circuit including current-limiting resistor 43, capacitor 44 and photo resistor 33, to the gate terminal of triac 18 to render that solid state switch conductive. Capacitor 16 initially introduces relatively little phase shift, so during the start-up period the gating voltage at triac 18 will be roughly in phase with the $T_1$-$T_2$ voltage and the triac will conduct during most of each half cycle. Hence, circuit junction 41 will be intermittently connected to line conductor $L_2$ through triac 18 and the full 120 volts AC from source 10 will be applied directly across field winding 14 to effect motor rotation in the direction that will lower the mattress support. As the motor rotates, the shifted phase voltage across winding 15 effectively adds to the voltage across winding 14 with the result that a voltage of about 240 volts RMS is produced between circuit junction 42 and line conductor $L_2$. Since there is practically no voltage drop from circuit junction 41 and through triac 18 to conductor $L_2$ while the motor rotates, the full 240 volts appears across phase shift capacitor 16.

The gating voltage at triac 18 therefore doubles in magnitude and shifts phase after motor 12 begins rotation. Capacitor 44, which may be replaced by a resistor, provides voltage dropping without power dissipation in order to maintain the gating voltage only as high as necessary to control the triac. A major advantage, however, of using the phase shifted voltage at junction 42 to gate triac 18 is that the gating voltage will be approximately 90° out-of-phase with respect to the $T_1$-$T_2$ voltage. Most of the 90° phase shift is attributable to capacitor 16, but if its capacitance is insufficient then the capacitance of capacitor 44 may be adjusted so that the two capacitors together will result in a 90° phase shift. With such a phase relationship, the gate current will always be at a maximum when the voltage appearing across terminals $T_1$ and $T_2$ of triac 18 completes one half cycle and passes through zero amplitude to begin the next opposite-polarity half cycle. Having high gate current at the start of a half cycle causes the triac to be gated on immediately so that field winding 14 is essentially continuously connected across line conductors $L_1$ to $L_2$. In effect, it may be likened to gating the triac with DC voltage. With such continuous operation of the triac, no radio frequency interference is generated.

Of course, when the mattress support decends to the desired vertical level, the patient releases down switch 23 and allows it to return to its home position shown in the drawing. This breaks the energizing circuit for photo coupler 31 and causes triac 18 to return to its off condition in which a very high impedance exists between main terminals $T_1$ and $T_2$, whereupon the AC line voltage is removed from winding 14 and motor 12 stops its rotation.

Rotation of motor 12 in the opposite direction to raise the mattress support is achieved in similar manner. The patient merely must depress push button switch 24 which completes the energizing circuit for lamp 29 of photo coupler 32, causing the resistance of photo resistor 34 to lower sufficiently to cause gate current to flow from circuit junction 41, and over the cross-coupling circuit including current-limiting resistor 47, capacitor 48 and photo resistor 34, to the gate terminal of triac 19. The triac is turned on in response to the gate current, as a consequence of which the 120 volts AC line voltage is supplied to winding 15 to cause the motor to operate in the opposite direction. Once the motor begins to rotate, the voltage at junction 41 doubles in magnitude and becomes phase displaced by about 90° relative to the $T_1$-$T_2$ voltage appearing at triac 19 so that the triac will be retriggered at the very beginning of each half cycle. The mattress-supporting structure therefore rises as long as up switch 24 remains depressed. The switch is released when the desired level is reached, whereupon the energizing circuit for photo coupler 32 opens thereby turning off triac 19 to disconnect source 10 from winding 15.

It is to be noted that switches 23 and 24 are relatively simple switches without any mechanical or electrical interlock. In other words, it is possible for the patient to close both switches simultaneously, thereby energizing lamps 28 and 29 at the same time.

In prior control systems for two-phase reversible motors having photo coupler controlled triacs, simultaneous energization of the photo couplers would result in both field windings receiving the same line voltage and no motor rotation would take place. This does not happen in the present invention. If switches 23 and 24 are both actuated at the same time, whichever triac is the most sensitive will conduct first and cause the motor to rotate in the direction controlled by that triac. As soon as that triac conducts, the voltage at its main terminal $T_2$ drops to less than 3 volts, relative to the voltage on line conductor $L_2$, and therefore it is impossible to generate enough gate current to trigger the non-conducting triac into conduction. Thus, even though both switches 23 and 24 are depressed simultaneously, the first triac that conducts effectively prevents the other triac from conducting because of the cross-coupling arrangement.

Another advantage of the present invention is that the non-energized photo coupler is subject to very low voltage, when the motor is running, thereby precluding the possibility of voltage breakdown. In prior circuits, relatively high AC voltage is impressed across the non-energized photo couplers during motor rotation and voltage breakdowns may occur.

The invention provides, therefore, a novel control system for using the shifted voltage, in a two-phase reversible motor, to provide gate current for the in-phase triac.

While a particular embodiment of the invention has been shown and described, modifications may be made, and it is intended in the appended claims to cover all such modifications as may fall within the true spirit and scope of the invention.

I claim:

1. A control system for controlling the operation of a two-phase reversible AC induction motor selectively in either direction of rotation, where the motor includes, in delta connection, first and second field windings and a phase shift capacitor, comprising:

an AC power source for providing AC line voltage of predetermined magnitude;

means for coupling the first field winding to said AC power source via a series-connected first solid state switch and for coupling the second field winding to said AC power source via a series-connected second solid state switch;

a first cross-coupling circuit, including a series-connected first photo resistor of a first photo coupler, coupled from the junction of the first field winding and the first solid state switch to the gate terminal of the second solid state switch;

a second cross-coupling circuit, including a series-connected second photo resistor of a second photo coupler, coupled from the junction of the second field winding and the second solid state switch to the gate terminal of the first solid state switch;

first energizing means for energizing said second photo coupler to supply gate current to the gate terminal of said first solid state switch to render said first solid state switch conductive, thereby to apply said AC line voltage directly to the first field winding to effect rotation of the motor in one direction;

and second energizing means for energizing said first photo coupler to supply gate current to the gate terminal of said second solid state switch to render said second solid state switch conductive, thereby to apply said AC line voltage directly to the second field winding to effect rotation of the motor in the opposite direction.

2. A control system according to claim 1 in which said AC power source has a pair of output terminals across which said AC line voltage is provided, wherein one of said output terminals is coupled to the junction of the first and second field windings, in which the main terminals of the first solid state switch are connected in series between the other output terminal of said AC power source and the junction of the first field winding and the phase shift capacitor, and wherein the main terminals of the second solid state switch are series-connected from said other output terminal to the junction of the second field winding and the phase shift capacitor.

3. A control system according to claim 2 in which the magnitude of the phase-displaced voltage developed across the phase shift capacitor, when the motor is rotating, is approximately twice said predetermined magnitude of said AC line voltage provided by said AC power source, and wherein the capacitor voltage effects the translation of gate current to the first solid state switch when the second photo resistor is energized and the motor is rotating in said one direction and to the second solid state switch when the first photo resistor is energized and the motor is running in said opposite direction.

4. A control system according to claim 1 in which said AC power source has first and second output terminals across which said AC line voltage is provided, wherein said first output terminals is coupled to the junction of the first and second field windings, in which each of said solid state switches is a triac having main terminals $T_1$ and $T_2$ in addition to its gate terminal, wherein the main terminal $T_2$ of the first solid state switch is coupled to the junction of the first field winding and the phase shift capacitor, wherein the main terminal $T_2$ of the second solid state switch is coupled to the junction of the second field winding and the phase shift capacitor, in which the main terminal $T_1$ of each of the first and second solid state switches is coupled to said second output terminal of said AC power source, and wherein said first cross-coupling circuit is coupled from the main terminal $T_2$ of the first solid state switch to the gate terminal of the second solid state switch and said second cross-coupling is coupled from the main terminal $T_2$ of the second solid state switch to the gate terminal of the first solid state switch.

5. A control system according to claim 4 in which each of said first and second cross-coupling circuits includes a series-connected capacitor for dropping the voltage applied to each gate terminal.

6. A control system according to claim 4 in which said first cross-coupling circuit includes a series-connected first capacitor and said second cross-coupling circuit includes a series-connected second capacitor, the combination of the phase shift capacitor and said first capacitor causing the gate voltage at the gate terminal of the first solid state switch to be approximately 90° out-of-phase with respect to the voltage appearing across the main terminals of the first solid state switch when the motor is rotating in said one direction, and the combination of the phase shift capacitor and said second capacitor causing the gate voltage at the gate terminal of the second solid state switch to be approximately 90° out-of-phase with respect to the voltage appearing across the main terminals of the second solid state switch when the motor is rotating in said opposite direction.

7. A control system according to claim 1 in which each of said first and second energizing means includes manually-operated switches for energizing said first and second photo couplers individually or simultaneously, the cross-coupling arrangement insuring that only one of the two solid state switches is rendered conductive at a time.

* * * * *

UNITED STATES PATENT OFFICE
CERTIFICATE OF CORRECTION

PATENT NO. : 4,140,950
DATED : February 20, 1979
INVENTOR(S) : JOSEPH A. VOLK, JR.

It is certified that error appears in the above-identified patent and that said Letters Patent are hereby corrected as shown below:

Claim 4, Column 7, line 25 cancel "terminals" and insert -- terminal --.

Claim 4, Column 8, line 4, after "cross-coupling" insert -- circuit --.

Signed and Sealed this

Fifth Day of June 1979

[SEAL]

Attest:

RUTH C. MASON
Attesting Officer

DONALD W. BANNER
Commissioner of Patents and Trademarks